United States Patent [19]
Arai et al.

[11] 4,388,844
[45] Jun. 21, 1983

[54] TRANSMISSION FLUID PRESSURE CONTROL DEVICE WITH TWO STEPPED LINE PRESSURES

[75] Inventors: Hajime Arai, Aichi; Shoji Haga, Toyota, both of Japan

[73] Assignee: Toyota Jidosha Kogyo Kabushiki Kaisha, Toyota, Japan

[21] Appl. No.: 193,441

[22] Filed: Oct. 3, 1980

[30] Foreign Application Priority Data

Nov. 5, 1979 [JP] Japan .................. 54-143754

[51] Int. Cl.³ .................. F16H 5/64; B60K 41/04
[52] U.S. Cl. .................. 74/752 C; 74/752 A; 74/867
[58] Field of Search .................. 74/867, 752 C, 752 A, 74/868, 861; 137/505.14, 505.15

[56] References Cited
U.S. PATENT DOCUMENTS

| | | | |
|---|---|---|---|
| 3,085,449 | 4/1963 | De Corte et al. | 74/752 C |
| 3,241,399 | 3/1966 | Fisher et al. | 74/752 C X |
| 3,625,322 | 12/1971 | Nagamatsu et al. | 74/752 C X |
| 3,714,836 | 2/1973 | Pierce et al. | 74/752 C |
| 3,738,193 | 6/1973 | Sumiyoshi et al. | 74/752 A X |
| 4,314,488 | 2/1982 | Lauven | 74/752 C X |

*Primary Examiner*—Rodney H. Bonck
*Attorney, Agent, or Firm*—Birch, Stewart, Kolasch & Birch

[57] ABSTRACT

A hydraulic fluid pressure control system for a transmission which is shifted between two speed stages via a hydraulic actuator. A line pressure regulation valve receives supply of fluid pressure from a pump and produces a regulated line pressure. A switching valve receives supply of this regulated line pressure and selectively supplies it as an operating pressure to the fluid actuator, according to the opening and closing of a pilot port. This operating pressure is also supplied to the line pressure regulation valve for increasing the regulated value of the line pressure when the fluid actuator is being operated.

5 Claims, 3 Drawing Figures

TRANSMISSION FLUID PRESSURE CONTROL DEVICE WITH TWO STEPPED LINE PRESSURES

BACKGROUND OF THE INVENTION

The present invention relates to a hydraulic fluid pressure control system for a transmission, and more particularly relates to a hydraulic fluid pressure control system for a transmission which is an overdrive or a subtransmission coupled to a main transmission, and which has two speed stages which are selected by selective supply of a hydraulic fluid pressure.

In a copending U.S. patent application Ser. No. 193,752 filed Oct. 3, 1980, which has been filed by the same applicants, and assigned to the same assignee, as the present application, there is described a transmission system which comprises a main transmission device which is a gear selection type transmission device which may be manually shifted between a plurality, usually three or more, of transmission speed stages, and which is coupled to a subtransmission or overdrive transmission device, which is a planetary gear type transmission device of separate construction from and attached to the main transmission device, and which is selectable, independently of the main transmission device, between a high speed stage and a low speed stage, which in most cases are an increased speed stage and a direct connection speed stage.

Further, in the abovementioned copending patent application, there is proposed such a transmission in which the selection thereof between its two speed stages is performed by selective supply of hydraulic fluid pressure to a hydraulic fluid actuator comprised therein. This selective supply of hydraulic fluid pressure, according to the operating conditions of the vehicle incorporating the transmission, and of the engine driving it, may be performed automatically, in order to reduce the difficulty of operation of the automobile by the driver thereof.

A problem in prior art transmission systems has been that a line hydraulic fluid pressure used for various functions within the transmission control system has been maintained at a substantially constant level, whatever use is being made of this line hydraulic fluid pressure. Thus, a high line pressure was maintained, even when no substantial use was being made of this line pressure for operating fluid actuators for friction engaging elements of the transmission. This has caused undue strain upon various operating components of the transmission such as the hydraulic fluid pressure pump thereof, and also has resulted in undue use of energy for pressurizing hydraulic fluid up to this line pressure, when supply of such pressurized hydraulic fluid is not required.

Further, in the case of a subtransmission which is electrically controlled, and in which switching of hydraulic fluid pressure is performed by a switching valve which is controlled by a solenoid, because typically a shifting member of the switching valve has been directly shifted by the solenoid, such a solenoid has had to be relatively bulky, and has caused a substantial power drain upon the electrical system of the automobile. Further, heavy duty relays are required for the control of such a solenoid, if the solenoid is controlled by a computer such as a microcomputer, as is nowadays frequently the case.

SUMMARY OF THE INVENTION

Accordingly, an object of the present invention is to provide a hydraulic fluid pressure control system for a transmission which incorporates a hydraulic fluid pressure actuator, in which a line pressure present within the hydraulic fluid pressure control system is desirably arranged to be maintained at a lower level when this line pressure is not required for operating the actuator, and is maintained at a desirably higher level when it is required for operating the actuator, thus saving wear and tear on the mechanical parts of the system, and using less power.

A further object of the present invention is to provide such a hydraulic fluid pressure control system for a transmission, which is electrically controllable by the opening and closing of a small pilot port, as by a solenoid which is relatively high and small in weight and construction.

A further object of the present invention is to provide a suitable hydraulic fluid pressure control system for a subtransmission which has two speed stages, and which comprises a fluid actuator, wherein selective supply of hydraulic fluid pressure switches it between these stages.

According to the present invention, these and other objects are accomplished by, for a transmission which comprises a hydraulic fluid pump and a hydraulic actuator and which is selectively shifted between speed stages according to selective supply of hydraulic fluid pressure to said hydraulic actuator, providing a hydraulic fluid pressure control system including (a) a line pressure regulation valve, which receives a supply of hydraulic fluid pressure from said hydraulic fluid pump, and which produces a regulated line hydraulic fluid pressure; and (b) a switching valve, comprising a pilot port, which receives a supply of said line hydraulic fluid pressure, and which selectively supplies said line hydraulic fluid pressure as an operating pressure to said hydraulic actuator according to the opening and closing of said pilot port. The said operating pressure, when thus provided by said switching valve, being also supplied to said line pressure regulation valve and increasing the regulated value of said line hydraulic fluid pressure whereby, when operating hydraulic fluid pressure is not being provided to said hydraulic actuator, the value of said line hydraulic fluid pressure is maintained at a predetermined lower level. However, when operating hydraulic fluid pressure is being provided to said hydraulic actuator, the value of said line hydraulic fluid pressure is maintained at a predetermined higher level; and thus the load on said hydraulic fluid pump, when said operating pressure is not required to be provided to said hydraulic actuator, is low.

According to such a construction, since the operating pressure which is supplied to the actuator for engaging a speed of the transmission is also supplied to the line pressure regulation valve for increasing the regulated value of the line hydraulic fluid pressure to a value which is abundantly sufficient for positively operating the actuator, thereby the set value of the line hydraulic fluid pressure when operating pressure is not being supplied to the actuator may be desirably arranged to be substantially lower, thus saving energy and also increasing durability of the hydraulic fluid pressure control system and of the hydraulic fluid pressure pump.

BRIEF DESCRIPTION OF THE DRAWINGS

The present invention will now be shown and described with reference to a preferred embodiment thereof, and with reference to the illustrative drawings. It should be clearly understood, however, that the description of the embodiment, and the drawings, are all of them given purely for the purposes of explanation and exemplification only, and are none of them intended to be limitative of the scope of the present invention in any way, since the scope of the present invention is to be defined solely by the legitimate and proper scope of the appended claims. In the drawings:

DESCRIPTION OF THE PREFERRED EMBODIMENT

Figure 1:
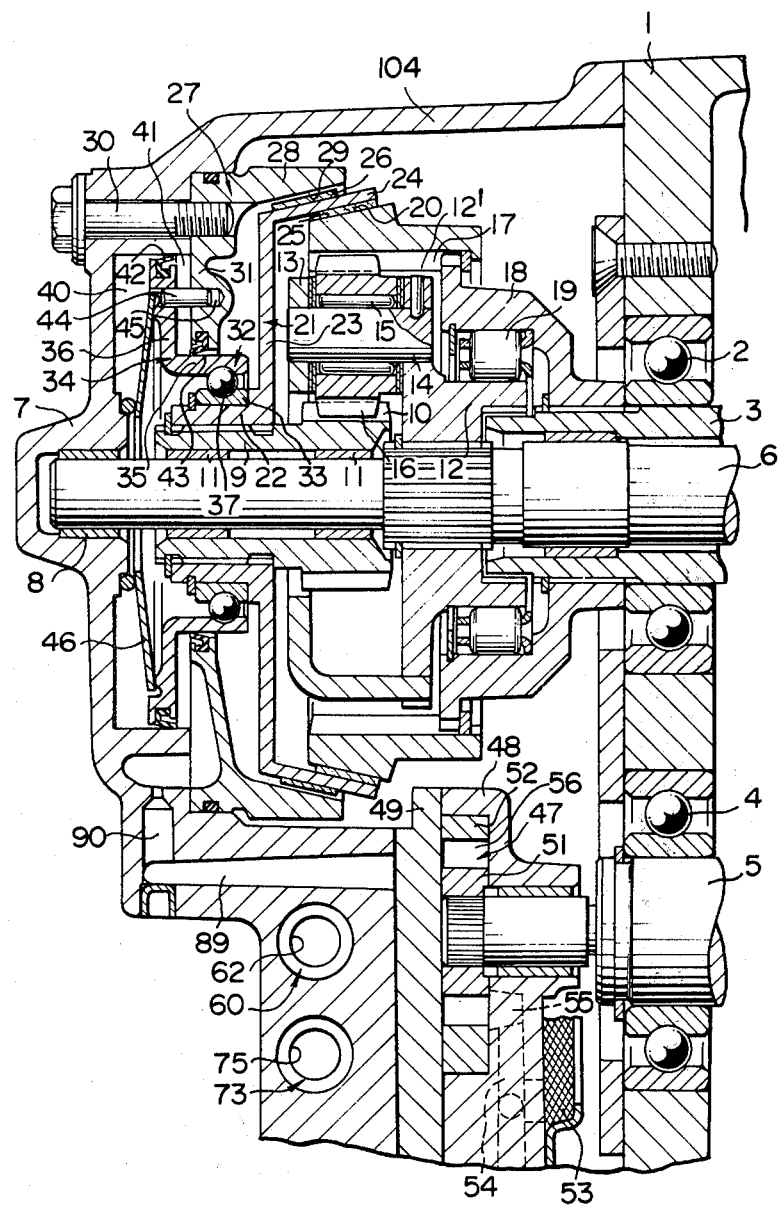
FIG. 1 is a longitudinal cross-sectional view showing the essential parts of a subtransmission incorporating a hydraulic fluid pressure actuator which is suitable for being controlled by the hydraulic fluid pressure control system according to the present invention, and also showing in outline form sections through two valves comprised in a preferred embodiment of the present hydraulic fluid pressure control system.

FIG. 1 is a cross-sectional view showing an overdrive transmission which is controlled by a hydraulic fluid pressure control system which is a preferred embodiment of the present invention. This transmission is disclosed and claimed, as has been mentioned before, in copending U.S. patent application Ser. No. 193,752 filed Oct. 3, 1980, which has been filed by the same applicants as, and has been assigned to the same assignee as, the present application. This transmission is selectively shiftable between two speed stages according to selective supply of operating hydraulic fluid pressure to a hydraulic fluid operated actuator, and comprises a hydraulic fluid pressure pump.

Figure 2:
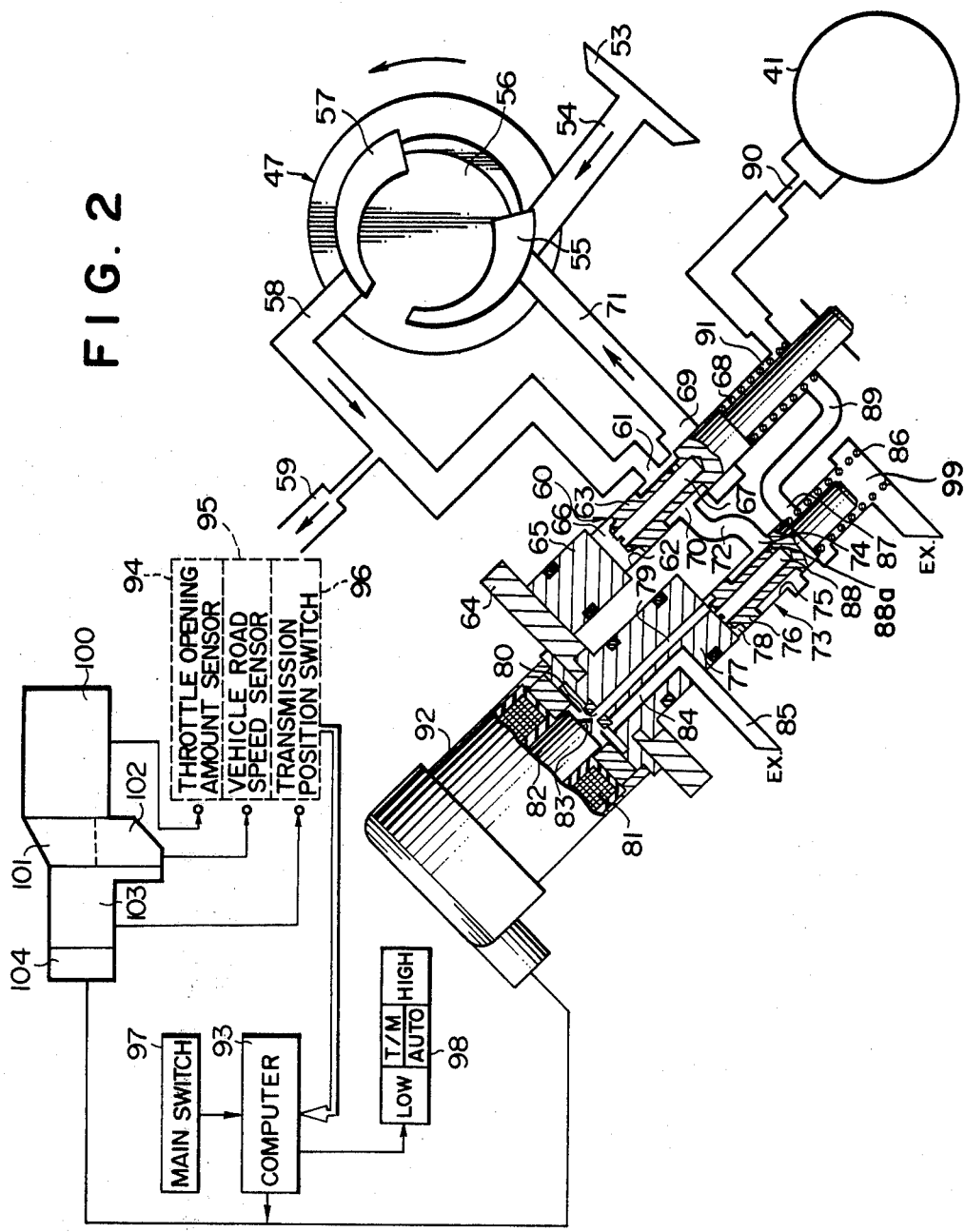
FIG. 2 is a part sectional part schematic view, showing in longitudinal section these two valves, which are essential components of the preferred embodiment of the hydraulic fluid pressure control system according to the present invention, schematically showing a hydraulic fluid pressure pump and a hydraulic fluid pressure actuator incorporated in the also schematically shown subtransmission shown in more detail in FIG. 1, and also showing schematically an engine, a main transmission, a clutch, and a differential gear device of a vehicle incorporating the subtransmission, and showing the above valves in their states wherein no supply of operating pressure is being provided to said hydraulic fluid pressure actuator.
Figure 3:
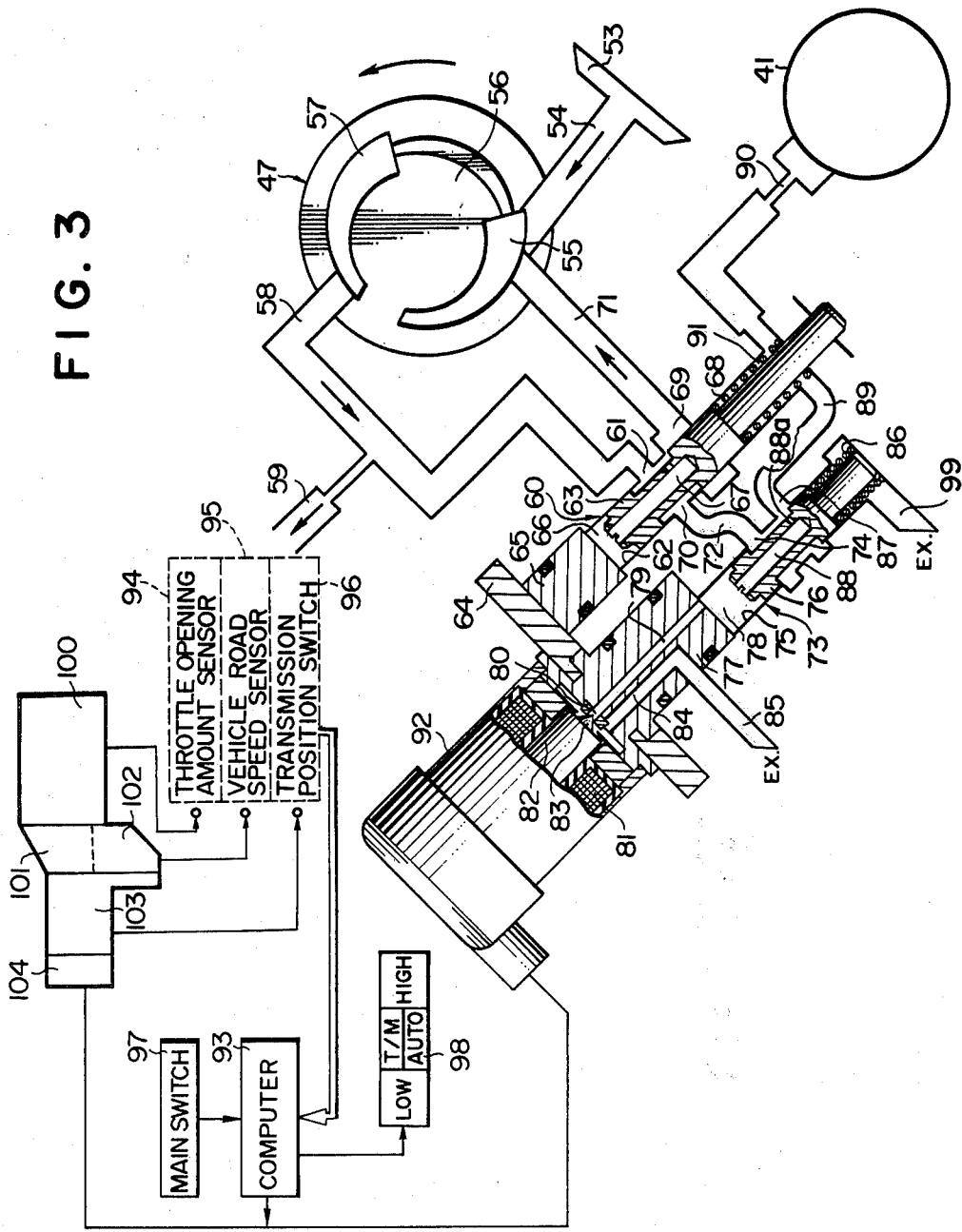
FIG. 3 is a view similar to FIG. 2, showing the same elements in their states when supply of hydraulic fluid pressure is being provided to said hydraulic fluid pressure actuator.

The general layout of the automotive vehicle to which this overdrive transmission, generally designated by 104, is fitted, is shown in FIGS. 2 and 3 in block diagram form. These figures also show the particular structure of the hydraulic fluid pressure control system according to the preferred embodiment of the present invention, in its two operating states, respectively, as will be explained hereinafter. In FIGS. 2 and 3, in block diagram form, reference numeral 100 designates an internal combustion engine, to which is connected a clutch 101. Rotational power transmitted from the engine 100 passes through the clutch 101 to the transmission 104, which in fact may be considered as a subtransmission, and thence is transmitted to a main transmission device 103. The main transmission device 103, which will not be specifically explained in detail here, is in fact a gear selection type manual transmission, and has a main casing designated by the reference numeral 1. The clutch 101 and the subtransmission 104 are in fact mounted at opposite ends of the main casing 1 of the main transmission device 103. Further, power output from the main transmission device 103 is fed to a per se conventional differential device 102, whence it is supplied to the driving wheels of the vehicle, which in fact are the front wheels, because this particular transmission layout as a whole is particularly suitable for a front engine front wheel drive vehicle, i.e. a so called FF vehicle.

Now the structure of the subtransmission 104 will be explained in more detail, referring to FIG. 1. A tubular intermediate shaft 3 projects a little to the left in the drawing out of the left hand side of the main casing 1. Further, one end of a power output shaft 5, again, projects a little to the left in the drawing out of the left hand side of the main casing 1. Through the center of the tubular intermediate shaft 3, and coaxial therewith, there passes a power input shaft 6. The power input shaft 6 is rotatable within the intermediate shaft 3 on plain bearings. The right hand end in the drawings, not shown, of the power input shaft 6 is connected via the clutch 101 to the power output shaft of the internal combustion engine 100 which drives the automobile to which this transmission system is fitted, and the left hand end in the figures of the power input shaft 6 projects out from the left hand end of the tubular intermediate shaft 3 for a certain distance, and is rotatably supported by a plain bearing 8, which is mounted in a sub-casing 7.

The sub-casing 7 is attached to the left hand side in the drawings of the main casing 1 by fixing means. When these fixing means are disengaged, the sub-casing 7 may be removed in the left hand direction in the drawings from the main casing 1, along with the subtransmission 104, and will then leave projecting from the main casing 1 only the end of the power output shaft 5, the end of the intermediate shaft 3, and projecting from this the end of the power input shaft 6, all three of which shafts have splines formed thereon, as will be explained later. Accordingly, in applications for the main transmission device 103 incorporating the main casing 1 in which it is not required to provide any subtransmission such as the subtransmission 104 shown in the drawings, it will be relatively easy to mount a simple connecting member between the splines on the intermediate shaft 3 and the splines on the power input shaft 6 which projects out therefrom, in order fixedly to couple these two shafts together so as to utilize the main transmission device 103 incorporating the main casing 1 by itself. This has a useful meaning with regard to flexibility of design and production of various models of automobile.

On the portion of the power input shaft 6 which protrudes out from the end of the intermediate shaft 3, and which is closer to the end of the intermediate shaft 3, there are formed some splines, and to the left of these splines in the drawing the power input shaft 6 is smooth. Upon this smooth end portion of the power input shaft 6 there is mounted, via plain bearings 11, a helically cut sun gear 10 which is formed with a hub extension 9 protruding leftwards from it in the drawing. Thus, the helical sun gear 10 is rotatably supported upon the power input shaft 6.

The helical sun gear 10 is axially slidable on the plain bearings 11 for a certain distance to the left and the right in the drawing on the input shaft 6.

On the aforesaid splined portion of the power input shaft 6 nearer to the end of the intermediate shaft 3, there is mounted a carrier 12 which has internal splines, so that the carrier 12 is rotationally fixed to the power input shaft 6. The carrier 12 is fitted with a plurality of pinion shafts 14, only one of which can be seen in FIG. 1, which are penetrated into holes in the carrier 12 and are fixed therein by engagement pins 12'. The pinion shafts 14 rotatably support, via needle bearings 15, helically cut planetary pinions 16. On the ends of the pinion shafts 14 remote from the carrier 12 there is mounted a cover 13. The planetary pinions 16 are meshed with the helical sun gear 10, and, when the carrier 12 rotates with respect to the helical sun gear 10, perform planetary motion around the helical sun gear 10 in a per se well known fashion.

To the aforesaid splines on the end of the intermediate shaft 3 there is engaged a connecting member 18, which is thereby rotationally coupled to the intermediate shaft 3. A helically cut ring gear 17 is mounted on the connecting member 18, and the inside of this helical ring gear 17 is meshed with the helical planetary pinions 16. Accordingly, the helical ring gear 17 is rotationally coupled to the intermediate shaft 3. Between the carrier 12 of the helical planetary pinions 16 and this connecting member 18 there is mounted a one way clutch 19. This one way clutch 19 is so constructed as to connect the carrier 12 rotationally to the connecting member 18, i.e. to the helical ring gear 17, when the carrier 12 attempts to rotate at a higher speed in the normal direction of rotation provided by the engine 100 of the vehicle, than the connecting member 18.

On the outer circumference of the helical ring gear 17 there is formed a conical clutch facing 20. A brake member 27, which is formed as a disk 31 and a ring 28 mounted to the outer circumference of the disk 31, is fixed by a bolt 30 (actually a plurality of bolts 30 are provided but only one is shown in the drawing) to the rear sub-casing 7. The disk 31 has a central hole. The inner circumferential surface of the ring 28 is formed as a conical brake facing 29 opposing the conical clutch facing 20 formed on the helical ring gear 17 with a certain gap therebetween.

A frictional engagement member 21 is formed of three parts: a tubular hub portion 22, a disk portion 23 attached to the right hand end in the drawing of the hub 22 and extending outward therefrom, and a cone portion 24 extending in the right hand direction in the drawing from the outer circumference of the disk portion 23, and projecting between the conical clutch facing 20 and the conical brake facing 29. On the inner circumference of the cone portion 24 there is attached an annular clutch pad 25, and on the outer circumference of the cone portion 24 there is attached an annular brake pad 26. The hub portion 22 of the frictional engagement member 21 is supported on the hub extension 9 of the helical sun gear 10, and is rotationally connected thereto by splines.

In the shown embodiment, the frictional engagement member 21 is also axially fixed to the helical sun gear 10. Because the helical sun gear 10 is axially movable through a certain range along the smooth end portion of the power input shaft 6, as mentioned above, thereby the frictional engagement member 21 is axially displaceable between a first position, to the right in the drawing, wherein the annular clutch pad 25 engages the conical clutch facing 20 formed on the helical ring gear 17, and accordingly the helical sun gear 10, the frictional engagement member 21, and the helical ring gear 17 are all rotationally coupled together, and a second position, to the left in the drawing, wherein the annular brake pad 26 engages with the conical brake facing 29 formed on the brake member 27, and accordingly the helical sun gear 10, the frictional engagement member 21, and the sub-casing 7 are all rotationally coupled together, via the brake member 27, so that the helical sun gear 10 is rotationally fixed.

The arrangements for displacing the frictional engagement member 21 between its aforesaid first and second positions will now be described. On the outer circumference of the hub portion 22 of the frictional engagement member 21 there is fitted an inner race 33. Running along this inner race 33 there are provided a plurality of balls 37. A piston member 34 is formed of a disk 36 with a hole through its center, and a hub portion 35 protruding in the right hand direction in the drawing from the inner circumference of the disk 36. An outer race, engaged with the balls 37, is directly cut on the inner surface of the hub portion 35. This outer race, the balls 37, and the inner race 33, together constitute a ball bearing 32, which engages the piston member 34 to the frictional engagement member 21 in such a fashion that these members are axially fixed with respect to one another, but are rotationally free with respect to one another.

The disk portion 36 of the piston member 34 is fitted into a circular hole formed in the inner side of the left hand end in the drawing of the sub-casing 7, and a fluid seal is positively ensured between these two members by a seal member 42 mounted in an outer groove on the disk portion 36 of the piston member 34. The outer circumference of the hub portion 35 of the piston member 34 is engaged with the inner circumference of the central hole pierced through the disk portion 31 of the brake member 27, and further between these two members there is mounted a seal member 43, which is seated in a circumferential groove formed on the aforesaid inner circumferential surface of the central hole through the disk member 31, and which positively ensures a fluid seal by its contact against the hub portion 35. Accordingly, an annular chamber 41 is defined around the hub portion 35 of the piston member 34, by the cooperation of the sub-casing 7 and the piston member 34, on the right hand side in the drawing of the disk portion 36. This annular chamber 41 is sealed by the seal members 42 and 43, and constitutes an actuating fluid pressure chamber for driving the piston member 34. In order positively to prevent rotational movement between the piston member 34 and the sub-casing 7, without hindering axial movement of the piston member 34 within the sub-casing 7, an indexing pin 44 is mounted in a hole in the disk portion 36 of the piston member 34, and its end protrudes across the pressure chamber 41 and its tip is projected into a hole 45 formed in the disk portion 31 of the brake member 27. Accordingly, as this pin 44 slides in and out of the hole 45, the piston member 34 can move axially to and fro within the sub-casing 7, increasing and decreasing the size of the annular fluid pressure chamber 41, freely, but cannot rotate with respect to the sub-casing 7.

On the left hand side in the drawing of the piston member 34, between its disk portion 36 and the sub-casing 7, there is fitted an annular disk spring 46, which urges the piston member 34 and, connected thereto, the frictional engagement member 21 to the right in the drawing, i.e. urges the frictional engagement member 21 to its said first position wherein it is frictionally engaged to the helical ring gear 17. Further, hydraulic fluid pressure is selectively supplied to the annular fluid pressure chamber 41, via passages 89 and 90 formed in the sub-casing 7, under the control of a switching system, which is not shown in detail in FIG. 1, but which will be described later, from a rotary hydraulic fluid pressure pump 47. This pump 47 comprises an outer rotor 52 which is fixed to the sub-casing 7, and an inner rotor 51 which is, via splines, drivingly engaged to the left hand end of the power output shaft 5 which projects out from the main casing 1, as described above.

The subtransmission described above operates as follows. When no hydraulic fluid pressure is supplied to the annular fluid pressure chamber 41, then the piston member 34 is biased to the right in the drawing by the resilient force of the disk spring 46, and accordingly the frictional engagement member 21 is also biased to the right in the drawing, i.e., towards its first position wherein, via the clutch pad 25, its cone portion 24 is frictionally engaged to the conical clutch facing 20 formed on the helical ring gear 17. In this state, therefore, the helical sun gear 10 and the helical ring gear 17 are rotationally coupled to one another, and accordingly the planetary gear mechanism as a whole, including the carrier 12 and the connecting member 18, is in a locked state. Accordingly, the power input shaft 6, which is splined to the carrier 12, is rotationally coupled to the intermediate shaft 3, which is splined to the connecting member 18. Accordingly, input power transmitted by the rotation of the crankshaft of the internal combustion engine 100 to the power input shaft 6 is directly transmitted to the intermediate shaft 3, without change of the rotational speed thereof. Thence, of course, via the main transmission device 103 which is not shown in detail, this rotational power is transmitted to the power output shaft 5, and to the differential device 102, but this is not strictly relevant to the present invention. This state of the subtransmission 104 is the directly connecting stage, wherein no increase of rotational speed is provided thereby.

On the other hand, when a specified value of hydraulic fluid pressure is supplied to the annular fluid pressure chamber 41, then the pressure exerted on the right hand side of the disk portion 36 of the piston member 34 drives the piston member 34 to the left in the drawing, against the biasing action of the disk spring 46, and the frictional engagement member 21 is also moved to the left in the drawing, because it is coupled to the piston member 34 by the bearing 32, and cannot be moved with respect thereto in the axial direction. As a matter of fact, in this particular structure, because the frictional engagement member 21 is axially fixed to the tubular extension 9 of the helical sun gear 10, the helical sun gear 10 also moves a little to the left in the drawing at this time, by the sliding of the plain bearings 11 on the power input shaft 6, with respect to the sub-casing 7, but this does not substantially affect the condition of meshing between the helical sun gear 10 and the helical planetary pinion 16. However, the movement of the frictional engagement member 21 to the left in the drawing disengages the conical clutch pad 25 from the conical clutch facing 20 formed on the helical ring gear 17, and engages the conical brake pad 26 with the conical brake facing 29 of the brake member 27, thus stopping the rotation of the frictional engagement member 21, and, accordingly, stopping the rotation of the helical sun gear 10, because the helical sun gear 10 is rotationally fixed to the frictional engagement member 21 and, in this state, thereby to the sub-casing 7. Accordingly, in this state, the rotation of the power input shaft 6 provided by the action of the internal combustion engine 100 is transmitted, via the splined portion thereof, to the carrier 12 which carries the helical planetary pinions 16, and in a per se well known way is transmitted to the helical ring gear 17 at an increased rotational speed, i.e., at a reduction gearing ratio less than unity. That is to say, the helical ring gear 17 rotates faster than does the power input shaft 6, and accordingly the connecting member 18, which is connected to the helical ring gear 17, and the intermediate shaft 3, which is splined to the connecting member 18, likewise rotate at a higher rotational speed than does the power input shaft 6. Thus, the shown embodiment of the subtransmission 104 provides its speed increasing stage.

Accordingly, by the selective supply of hydraulic fluid pressure to the annular fluid pressure chamber 41, the frictional engagement member 21 may be driven between its first and its second positions, and, according to this, the subtransmission 104 provides either the direct connection stage, or the speed increasing stage. This is accomplished, as explained above, with a very compact construction, which is economical in its space requirements.

By the shown construction in which the outer race of the bearing 32 is directly provided by the inner part of the hub portion 35 of the piston member 34, the radial dimension of the connecting structure between the piston member 34 and the frictional engagement member 21 may be much reduced, thereby lightening the construction. Further, because the number of parts in the construction is reduced, it is easy and cheap to make, and reliable in service.

Now, referring to FIGS. 2 and 3, the hydraulic fluid pressure control system according to the present invention will be particularly described, and its controlling action for the subtransmission 104 will be explained. The two valves comprised in this hydraulic fluid pressure control system may be seen in schematic axial cross section in FIG. 1; however, their more detailed structures may be seen in FIGS. 2 and 3, which show them in longitudinal cross section.

The oil pressure pump 47 sucks up oil through its input port 55 from the lower part of the rear casing 7 through a filter 53 and through an oil passage 54, which is formed within the oil pump casing 48. In a per se well known fashion, this oil, which is pressurized in the pump chamber 56 defined between the inner rotor 51 and the fixed outer rotor 52 by the rotation of the inner rotor 51, is ejected through the output port 57 of the oil pressure pump 47 and through the oil passage 58 formed in the rear casing 7. A portion of this oil is diverted from the oil passage 57 as lubricating oil to be supplied to the bearings of the power input shaft 6 and other bearings of the subtransmission 104 and of the main transmission 103; but the major portion of this pressurized oil is supplied to a port 61 of a line pressure regulation valve 60.

The line pressure regulation valve 60 comprises a bore 62 formed in the rear casing 7 of the subtransmission 104 in the direction perpendicular to the plane of the drawing paper in FIG. 1, and further comprises a valve element 63 which reciprocates within this bore 62. The upper end in FIG. 2 of the bore 62 is closed by a plug 65, which is retained in place by a cover 64. Between the upper end in FIG. 2 of the valve element 63 and the plug 65, within the bore 62, there is therefore defined a first pressure chamber 66. At the lower end of the bore 62 the valve element 63 is narrowed to a smaller diameter and is protruded out from the end of the bore. Within this part of the bore 62, around the narrowed part of the valve element 63, there is fitted a compression coil spring 68, which biases the valve element 63 upwards in FIG. 2 so as to tend to diminish the size of the first pressure chamber 66. Thus, this compression coil spring 68 sits within a second pressure chamber 91, supply of fluid pressure to which biases the valve element 63 in the same direction as does the compression coil spring 68, and which has a smaller effective operational area (i.e., the area of the land defined between the larger and the smaller diameter portions of the valve element 63) for exerting fluid pressure on the valve element 63, than does the first pressure chamber 66.

The input port 61 opens to an annular chamber formed around a narrowed intermediate portion of the valve element 63, and the output port 70 also opens from this annular chamber. The fluid pressure present at the input port 61 is communicated to the pressure chamber 66 from this annular chamber, via a radial hole formed in the valve element 63, and via an axial hole 67 also formed therein. Further, a vent port 69 opens from a position in the bore 62 which is lower in the drawing than is the input port 61. This vent port 69 is drained to the input port 55 of the oil pump 47 via an oil passage 71.

The operation of this line pressure regulation valve is generally as follows. The output pressure produced by the oil pump 47 is communicated to the input port 61, and thence to the first pressure chamber 66, where it acts upon the valve element 63 via an effective working pressure area which is the entire cross-sectional area of the bore 62. Thereby, the valve element 63 is pushed downwards in the drawing against the compression force of the compression coil spring 68, and against any pressure which may be present within the second pressure chamber 91. According to the balance of these forces, if the pressure present at the input port 61 is greater than a certain value, the valve element 63 will be displaced downwards within the bore 62 by more than a certain distance, and accordingly the input port 61 will be communicated with the vent port 69, and pressure in the aforesaid annular intermediate chamber will be vented through the oil passage 71 to the oil pump 47. Accordingly, therefore, no further rise of the pressure within the annular intermediate chamber will be possible. On the other hand, if this pressure should drop, even by a small amount, then the valve element 63 will move somewhat upwards in the drawing so as to interrupt the communication between the input port 61 and the vent port 69, and accordingly the pressure within this annular intermediate chamber will be able to rise again, without being vented. Accordingly, by this action, the pressure within this annular intermediate chamber, and accordingly the pressure at the output port 70 of the line pressure regulation valve 60, is regulated to a desirable value. The effect of varying the biasing pressure within the second pressure chamber 91, however, will be explained later.

This regulated line pressure appearing at the output port 70 of the line pressure regulation valve 60 is led, via an oil passage 72, to an input port 74 of a switching valve 73. This switching valve 73 is superficially similar in construction to the line pressure regulation valve 60, but in fact performs an entirely different function. The switching valve 73 comprises a valve element 76 which slides to and fro within a bore 75, and which is biased in the upwards direction in the drawing by a compression coil spring 86. Above the valve element 76 in FIG. 2, between its upper end and the lower end of a plug 77 which is retained as blocking the end of the cylinder bore 75 by the same cover 64 which retains the plug 65, there is defined a pressure chamber 78. However, this pressure chamber 78 is not sealed as is the case with the pressure chamber 66, but is selectively vented by a pilot port 80 which will be explained hereinafter. Oil is supplied from the input port 74 to the pressure chamber 78, via a small radial hole 88a which leads to an axial hole 88 formed in the valve element 76. It is essential for the operation of this embodiment that the radial hole 88a should be of relatively small cross-sectional area, so that it functions as a throttling element.

The lower end of the valve element 76 in the drawing is received within a chamber 99 which is not a pressure chamber. This chamber 99 is vented at its bottom portion in the drawing. Further, at an axial position within the cylinder bore 75 somewhat below the input port 74, there is formed an output port 87. It is so arranged, in this embodiment, that when the valve element 76 is in its uppermost position within the valve bore 75, as shown in FIG. 2, then communication between the input port 74 and the output port 87 is interrupted, but the output port 87 is communicated, via the chamber 99, to a vent port to be vented. On the other hand, as the valve element 76 moves downwards within the valve bore 75 from the position shown in FIG. 2 towards the position shown in FIG. 3, where it is at its extreme lowermost position within the bore 75, during this motion communication of the output port 87 to the chamber 99 is interrupted, somewhat before communication of the input port 74 to the output port 87 is established.

The venting of the pressure chamber 78 through a passage 79 and the pilot port 80 is controlled by a solenoid 81. This solenoid 81 acts upon a plunger 82 whose tip portion 83 is formed as a valve element which cooperates with a pilot port 80 formed at the end of the passage 79. The solenoid assembly incorporating the solenoid 81 is housed within a cover 92 mounted on the cover 64. FIG. 2 shows the position of the parts wherein the solenoid 81 is energized so that it attracts the plunger 82 and thereby removes the valve element 83 from the pilot port 80. In this condition, oil within the pressure chamber 78 is vented through the passage 79 and through the open port 80 so as to pass through an oil passage 84 and be drained through an oil passage 85. In this condition, it should be appreciated that the actual line pressure present within the oil passage 72 and at the input port 74 of the switching valve 73 is not substantially lowered by this venting, because of the narrowness of the radial hole 88a formed in the valve element 76, which in this case functions as a throttling element and ensures that the pressure within the pressure chamber 78 can be effectively atmospheric pressure, without substantially affecting the pressure at the input port 74. The oil vented through the oil passage 85 is released to the interior of the rear casing 7.

The output port 87 of the switching valve 73 is communicated via the oil passage 89 with a port provided in the second pressure chamber 91 of the pressure regulation valve 60. From a port on the other side of this second pressure chamber 91, as viewed in FIG. 2 or 3, this pressure is conducted, via an oil passage 90 formed in the rear casing 7, to the annular pressure chamber 41 of the subtransmission 104 as an actuating fluid pressure.

As shown in FIGS. 2 and 3, in the shown application of this embodiment, a throttle opening amount sensor 94 is provided for the internal combustion engine 100, a vehicle road speed sensor 95 is provided as connected to the differential device 102, and a transmission position switch 96 is provided as connected to the main transmission device 103. The output signals from these elements are conducted via a bus to a computer 93, which also receives power via a main switch 97. The computer 93 provides an output signal for energizing the solenoid 81. Further, the computer 93 also produces a display signal for controlling a display device 98 which shows the stage to which the subtransmission 104 is currently shifted, so that the driver of the vehicle may know whether the subtransmission 104 is in the high speed stage or the low speed stage.

In other embodiments of the present invention, the energization of the solenoid 81 could be performed in other ways, and according to other criteria than the ones practiced in the shown embodiment. Further discussion of the details of the control of the solenoid 81 by the computer 93, according to the signals provided by the sensors 94 and 95, and the switch 96, etc., will not be made here, because it is not germane to an understanding of the present invention, and this control may be varied, according to circumstances.

The hydraulic fluid pressure control system which has been described operates as follows. When the solenoid 81 is energized by the computer 93, as explained above, it attracts the solenoid member 82 and its valve element 83 away from the pilot port 80, and thereby the pressure chamber 78 is vented, via the passage 79, the port 80, the passage 84, and the passage 85, to be at substantially atmospheric pressure. Accordingly, under the biasing action of the compression coil spring 86, the valve member 76 of the switching valve 73 is impelled to its uppermost position within the bore 75, as shown in FIG. 2, by the compression coil spring 86. In this condition, connection of the input port 74 to the output port 87 is positively interrupted.

Further, according to a particular feature of this embodiment, at this time the output port 87 is vented via the chamber 99, and thereby the pressure within the annular pressure chamber 41 of the subtransmission 104, the oil passage 90, the second pressure chamber 91 of the line pressure regulation valve 60, the passage 89, and the chamber 99 is substantially atmospheric. This ensures positively that the piston member 34 of the cylinder piston device explained above incorporated in the subtransmission 104 is positively allowed to return, under the biasing action of the spring 46, to its rightmost position in FIG. 1, so as to engage the sun gear 10 to the ring gear 17 by the engagement of the conical portion 24 of the friction engaging element 21 against the conical engaging clutch face 20 formed on the outside of the ring gear 17, via the clutch pad 25, so as to lock up the planetary gear mechanism and ensure that the subtransmission 104 is in its directly connected condition wherein it provides no speed increasing function between the power input shaft 6 and the intermediate shaft 3.

Also, because the pressure within the second pressure chamber 91 of the line pressure regulation valve 60 is substantially atmospheric, thereby the valve element 63 moves to and fro within the bore 62 under the opposing forces only of the compression coil spring 68, which impels it upwards in the drawing, and the pressure within the pressure chamber 66, which impels it downwards in the drawing, acting on it via an effective cross-sectional pressure area which is the full cross-sectional area of the bore 62. Accordingly, the line output pressure within the output port 70, the oil passage 72, and the input port 74, etc., is maintained at a certain level which is a relatively low controlled level, as has been explained above. This state will be the case whenever the automobile is running faster than a certain very low speed, since the oil pump 47 is activated by the turning of the output shaft 5, which directly drives the differential device 102. In this state, because the regulated value of the line pressure is at this certain first relatively low value, the load upon the oil pump 47 is relatively low, and accordingly does not consume a very great amount of the power generated by the internal combustion engine 100, and also does not cause undue wearing of the working parts of the oil pump 47, or strain thereon.

On the other hand, when the computer 93 does not energize the solenoid 81, then by the biasing action of the spring not shown in the drawing, or the like, the plunger 82 and the valve member 83 on its tip are displaced downwards, as shown in FIG. 3, so that the valve member 83 closes the pilot port 80 and interrupts communication therethrough. In this state the draining of the pressure chamber 78 of the switching valve 73 through the oil passage 79 and the pilot port 80, etc., is definitely interrupted. Accordingly, the pressure within this pressure chamber 78 rises substantially to line pressure, and, because the compression coil spring 86 is arranged to have a biasing force which is quite unable to withstand the effect of this line pressure acting upon the end of the valve element 76, thereby the valve element 86 is positively driven downwards in the bore 75, as shown in FIG. 3, to its extreme downmost position, wherein the communication of the output port 87 to the chamber 99 is interrupted, and instead the input port 74 is connected to the output port 87. Accordingly in this condition line pressure is conducted through the switching valve 75 and is supplied, via the oil passage 89, the second pressure chamber 91 of the line pressure regulation valve 60, and the passage 90, to the annular pressure chamber 41 of the subtransmission 104. Thereby, as explained above, the piston member 34 is driven to the left in FIG. 1, and impels the friction engagement member 21 to its leftmost position in FIG. 1, so as to bring the brake pad 26 into contact with the conical brake facing 29 formed upon the brake member 28, and so as thereby to couple the sun gear 10 to the brake member 28 and thereby to the rear casing 7, accordingly causing the planetary gear mechanism of the subtransmission 104 to function in its speed increasing condition, wherein it provides an increase of rotational speed between the power input shaft 6 and the intermediate shaft 3.

Further, according to a very important feature of this construction, the presence of the line pressure within the second pressure chamber 91 of the line pressure regulation valve 60 has a very definite function. The force due to this line pressure, which is of course substantially the same as the line pressure present within the first pressure chamber 66, counteracts a part of the force due to the line pressure present within this first pressure chamber 66, and ensures that the value of regulated line pressure provided by the pressure regulating valve 60 is at a substantially higher level than was the case in the above described condition wherein no pressure was being supplied to the annular pressure chamber 41 of the subtransmission 104. In more detail, in fact, because the effective cross-sectional operational area available for the pressure within the pressure chamber 91 is substantially smaller than that available for the substantially identical pressure within the chamber 66, the actual effective area available for operation of this pressure, as a whole, at the upper end of the valve element 63, is the difference between these two areas, i.e., in this embodiment is the cross-sectional area of the narrowed lower portion of the valve element 63. Accordingly, in order to counterbalance the pressure of the compression coil spring 68 to a sufficient amount to communicate the input port 61 with the vent port 69, a substantially higher line pressure is required to be present within the pressure chamber 66, and this is the controlled value of line pressure provided in this condition.

Thereby, by this increasing of the line oil pressure when it is actually required for driving the piston member 34, etc., by supply thereof to the annular pressure chamber 41, a proper high line pressure may be made available at this time for providing good operation of the subtransmission; and this without causing an undue load upon the internal combustion engine 100 of the vehicle, on the other hand, when this line pressure is not required. Further, undue wear upon the moving parts of the oil pump 47, and strain thereon, is reduced by this concept of varying the line pressure according to the demands thereon. Further, the construction explained above in which the valve member 76 of the switching valve 73 is displaced between its two positions within the bore 74, not directly by being moved by the solenoid 81, but under the influence of the pressure in the pressure chamber 78 which is selectively drained by the opening and closing of the pilot port 80 by the valve element 83 controlled by the solenoid 81, since the amount of valve lift required to be provided by the solenoid 81 is much smaller than if the solenoid 81 were to directly control the motion of the valve member 76, accordingly the solenoid 81 may be smaller and lighter in construction than otherwise. According to such a construction, no heavy duty relay for controlling the solenoid 81 according to the electric signal from the computer 93 will be required.

In other possible embodiments of the present invention, the operating pressure for the annular pressure chamber 41 could be supplied to the second pressure chamber 91 of the pressure regulation valve 60 via a branch passage, as opposed to the arrangement of the present embodiment where this pressure is led through the chamber 91. Further, the draining of the output port 87 of the switching valve 73 via the chamber 99 is not essential to the present invention, although it is a desirable modification thereof. Accordingly, although the present invention has been shown and described with reference to a preferred embodiment thereof, and in terms of the illustrative drawings, it should not be considered as limited thereby. Various possible modifications, omissions, and alterations could be conceived of by one skilled in the art to the form and the content of any particular embodiment, without departing from the scope of the present invention. Therefore it is desired that the scope of the present invention, and of the protection sought to be granted by Letters Patent, should be defined not by any of the perhaps purely fortuitous details of the shown embodiment, or of the drawings, but solely by the scope of the appended claims, which follow.

We claim:
1. For a transmission which comprises a hydraulic fluid pump and a hydraulic actuator and which is selectively shifted between speed stages according to selective supply of hydraulic fluid pressure to said hydraulic actuator:

a hydraulic fluid pressure control system, comprising:
(a) a line pressure regulation valve, which receives a supply of hydraulic fluid pressure from said hydraulic fluid pump, and which produces a regulated line hydraulic fluid pressure; and
(b) a switching valve, comprising a pilot port, which receives a supply of said line hydraulic fluid pressure, and which selectively supplies said line hydraulic fluid pressure as an operating pressure to said hydraulic actuator according to the opening and closing of said pilot port;
(c) said operating pressure, when thus provided by said switching valve, being also supplied to said line pressure regulation valve and increasing the regulated value of said line hydraulic fluid pressure;
(d) whereby, when operating hydraulic fluid pressure is not being provided to said hydraulic actuator, the value of said line hydraulic fluid pressure is maintained at a predetermined lower level; but, when operating hydraulic fluid pressure is being provided to said hydraulic actuator, the value of said line hydraulic fluid pressure is maintained at a predetermined higher level; and thus
(e) whereby load on said hydraulic fluid pump, when said operating pressure is not required to be provided to said hydraulic actuator, is low.

2. For a transmission which comprises a hydraulic fluid pump and a hydraulic actuator and which is selectively shifted between speed stages according to selective supply of hydraulic fluid pressure to said hydraulic actuator:

a hydraulic fluid pressure control system, comprising:
(a) a line pressure regulation valve, comprising a first valve element and a first spring, which receives a supply of hydraulic fluid pressure from said hydraulic fluid pump, and which produces a line hydraulic fluid pressure regulated by the motion of said first valve element under forces produced by said supply of hydraulic fluid pressure and by said first spring acting on said first valve element in opposition; and
(b) a switching valve within which is defined a pressure chamber, and comprising a pilot port selectively venting said pressure chamber, an output port, a second spring, and a second valve element, which receives supply of said line hydraulic fluid pressure which is admitted into said pressure chamber, said second valve element being selectively shifted to and fro, so as selectively to supply said line hydraulic fluid pressure to said output port as an operating pressure for said hydraulic actuator, according to the opposition of: (b1) a force produced by said second spring, and (b2) a force due to pressure in said pressure chamber, when it is not selectively vented via said pilot port;
(c) said operating pressure for said hydraulic actuator being also supplied to said line pressure regulation valve so as to exert force on said first valve element in the same direction as the force exerted by said first spring, and so as to increase the regulated value of the line hydraulic fluid pressure;

(d) whereby, when operating hydraulic fluid pressure is not being provided to said hydraulic actuator, the value of said line hydraulic fluid pressure is maintained at a predetermined lower level; but, when operating hydraulic fluid pressure is being provided to said hydraulic actuator, the value of said line hydraulic fluid pressure is maintained at a predetermined higher level; and thus (e) whereby load on said hydraulic fluid pump, when said operating pressure is not required to be provided to said hydraulic actuator, is low.

3. For a transmission which comprises a hydraulic fluid pump and a hydraulic actuator and which is selectively shifted between speed stages according to selective supply of hydraulic fluid pressure to said hydraulic actuator:

a hydraulic fluid pressure control system, comprising:

(a) a line pressure regulation valve, comprising a first bore, a first valve element fitted slidably in said first bore, a first spring, a first input port, a first output port, a vent port, and a biasing port; a first pressure chamber being defined by the cooperation of said first valve element and said first bore, to which said first input port and said first output port open, pressure within which acts on said first valve element via a certain first effective pressure receiving area so as to increase the volume of said first pressure chamber; motion of said first valve element in the direction to increase the volume of said first pressure chamber, beyond a predetermined amount, communicating said vent port to said first pressure chamber; said first spring biasing said first valve element in the direction to reduce the size of said first pressure chamber; and a second pressure chamber being defined, supply of pressure to which urges said first valve element in the direction to reduce the size of said first pressure chamber via an effective pressure receiving area smaller than said first pressure receiving area, said biasing port opening to said second pressure chamber; and (b) a switching valve, comprising a second bore, a pilot port, a second input port, a second output port, a second valve element fitted slidably in said second bore, and a second spring; said second input port being connected to said first output port of said line pressure regulation valve; a third pressure chamber, to which said pilot port opens, being defined by the cooperation of said second valve element and said second bore; supply of hydraulic fluid pressure from said second input port to said third pressure chamber being provided through a restricted orifice; said second spring biasing said second valve element in the direction to reduce the size of said third pressure chamber, and pressure within said third pressure chamber urging said second valve element in the direction to increase the volume of said third pressure chamber; motion of said second valve element in the direction to increase the volume of said third pressure chamber through more than a certain distance from its extreme position in said second bore which minimizes the size of said third pressure chamber communicating said second input port to said second output port; pressure in said second output port being supplied to said hydraulic actuator as an operating pressure;

(c) said operating pressure being also supplied to said biasing port of said line pressure regulation valve;

(d) whereby, when operating hydraulic fluid pressure is not being provided to said hydraulic actuator, the value of said line hydraulic fluid pressure is maintained at a predetermined lower level; but, when operating hydraulic fluid pressure is being provided to said hydraulic actuator, the value of said line hydraulic fluid pressure is maintained at a predetermined higher level; and thus (e) whereby load on said hydraulic fluid pump, when said operating pressure is not required to be provided to said hydraulic actuator, is low.

4. A hydraulic fluid pressure control system according to claim 3, wherein said switching valve further comprises a second vent port, which is communicated to said second output port when said second valve element is in a position within said second bore substantially to minimize the volume of said third pressure chamber, but communication of which to said second output port is interrupted, during the motion of said second valve element within said second bore from said position in the direction to increase the size of said third pressure chamber, before said second input port is connected to said second output port; whereby, when actuating pressure is not being provided to said hydraulic actuator, said hydraulic actuator is drained via said second vent port, and is therefore positively deactivated.

5. A hydraulic fluid pressure control system according to claim 3 or claim 4, wherein supplying of said operating pressure to said hydraulic actuator is performed through said second pressure chamber; whereby it is positively assured that the fed back value of the actuator operating pressure to the line pressure regulation valve is always accurate.

* * * * *